US012129992B2

(12) United States Patent
Cacciabeve

(10) Patent No.: US 12,129,992 B2
(45) Date of Patent: Oct. 29, 2024

(54) CLAMPING WORK LIGHT

(71) Applicant: Walter R. Tucker Enterprises, Ltd., Deposit, NY (US)

(72) Inventor: Robert Cacciabeve, Denville, NJ (US)

(73) Assignee: Walter R. Tucker Enterprises, Ltd, Deposit, NY (US)

( * ) Notice: Subject to any disclaimer, the term of this patent is extended or adjusted under 35 U.S.C. 154(b) by 0 days.

(21) Appl. No.: 18/239,985

(22) Filed: Aug. 30, 2023

(65) Prior Publication Data

US 2024/0068647 A1 Feb. 29, 2024

Related U.S. Application Data

(60) Provisional application No. 63/402,188, filed on Aug. 30, 2022.

(51) Int. Cl.

| | |
|---|---|
| ***F21V 21/088*** | (2006.01) |
| ***F21L 4/04*** | (2006.01) |
| ***F21L 4/08*** | (2006.01) |
| ***F21V 21/14*** | (2006.01) |
| ***F21V 21/30*** | (2006.01) |
| ***F21Y 115/10*** | (2016.01) |

(52) U.S. Cl.

CPC ............ *F21V 21/0885* (2013.01); *F21L 4/04* (2013.01); *F21L 4/08* (2013.01); *F21V 21/145* (2013.01); *F21V 21/30* (2013.01); *F21Y 2115/10* (2016.08)

(58) Field of Classification Search

CPC .... F21V 21/0885; F21V 21/145; F21V 21/30; F21L 4/04

See application file for complete search history.

(56) References Cited

U.S. PATENT DOCUMENTS

| | | | | |
|---|---|---|---|---|
| 6,585,400 | B2 * | 7/2003 | Leen | F21V 21/0885 362/418 |
| 7,040,783 | B1 * | 5/2006 | Christianson | F21L 4/04 362/186 |
| D695,434 | S * | 12/2013 | Shen | D26/41 |
| 2009/0279290 | A1 * | 11/2009 | Henry | F21V 21/0885 362/396 |
| 2010/0238653 | A1 * | 9/2010 | Pelletier | F21V 21/406 362/191 |
| 2012/0033412 | A1 * | 2/2012 | Molina | F21V 21/088 362/119 |
| 2014/0126192 | A1 * | 5/2014 | Ancona | F21L 4/04 362/396 |
| 2014/0268700 | A1 * | 9/2014 | Mumma | H05B 47/105 362/183 |
| 2017/0167700 | A1 * | 6/2017 | Dorman | F21S 8/003 |
| 2020/0309355 | A1 * | 10/2020 | Cacciabeve | F21V 21/28 |

* cited by examiner

*Primary Examiner* — William N Harris

(74) *Attorney, Agent, or Firm* — Breiner & Breiner, L.L.C.

(57) ABSTRACT

The invention relates to a clamping work light. The clamping work light allows for hand free use as the light may be free standing or clamped to a surface. A light member may be rotated in multiple directions. The light member is attached to a stand made up of two clamp arms, the stand functions as both a stand for the light member and a clamping mechanism. The clamp arms will open up to four inches to allow the light to be attached to different size objects and surfaces. The light may be locked in a compact storage position.

13 Claims, 13 Drawing Sheets

FIG. 13B
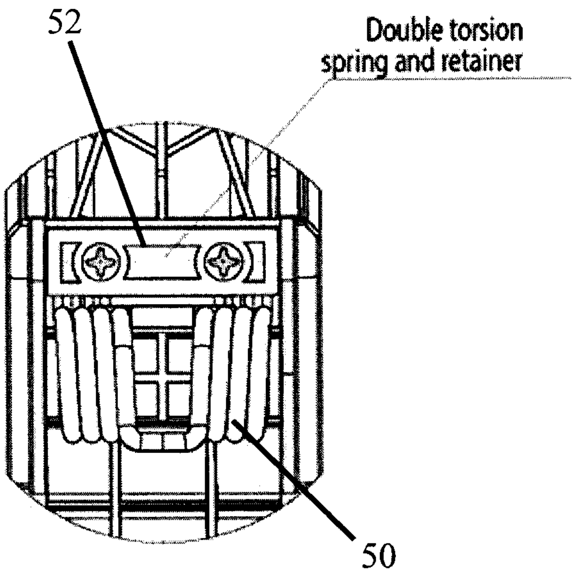
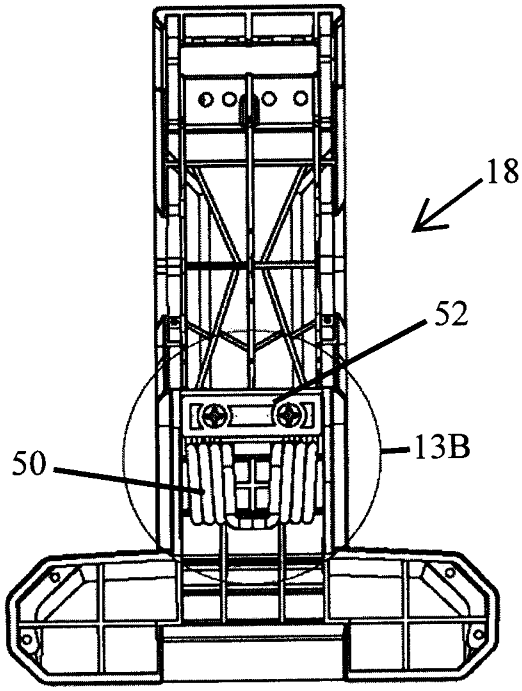
FIG. 13A
FIG. 13C
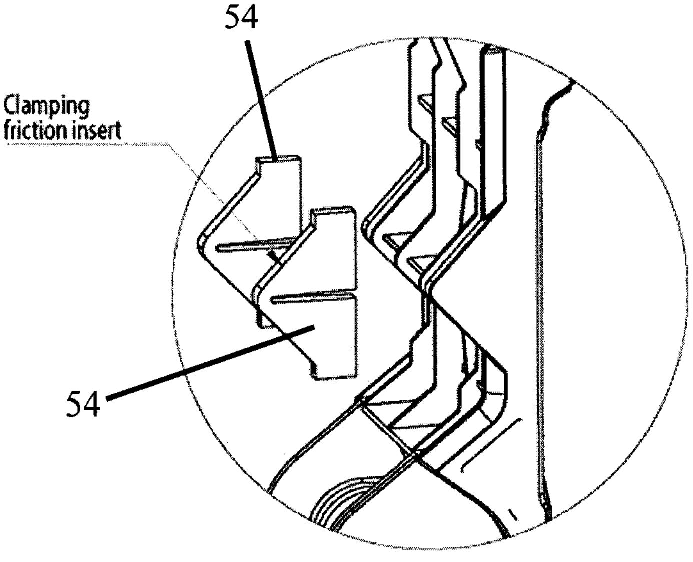

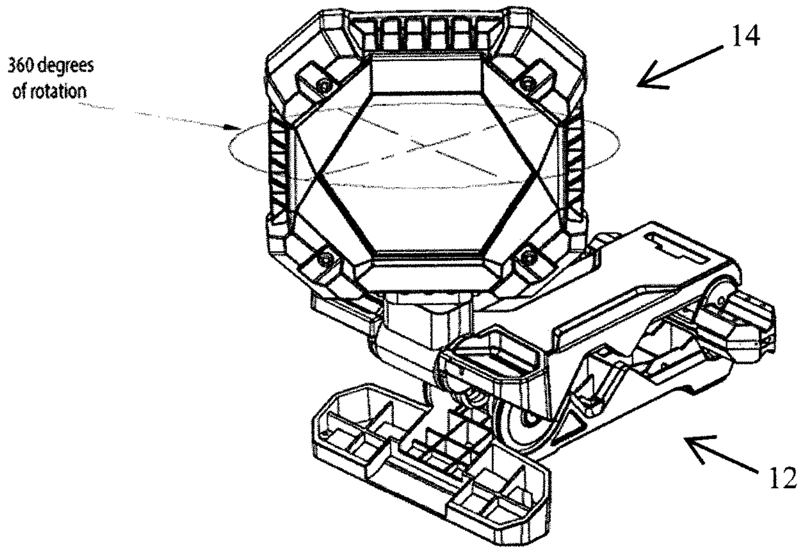
FIG. 16
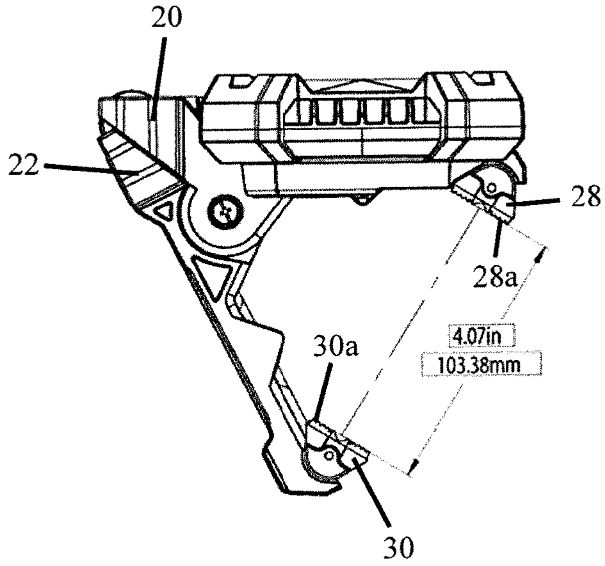
FIG. 18
FIG. 17
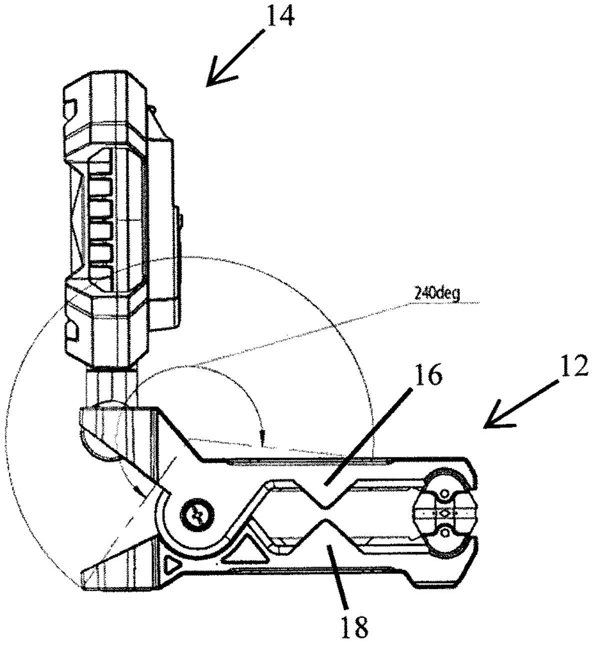

CLAMPING WORK LIGHT

RELATED APPLICATION

This application claims benefit of U.S. Provisional Application Ser. No. 63/402,188, filed Aug. 30, 2022, entitled "Clamping Work Light," which application is incorporated herein by reference in its entirety.

FIELD OF THE INVENTION

The present invention relates to a clamping work light. More particularly, the invention relates to a clamping work light which may stand alone or be clamped to an object and having a light which will rotate in multiple directions to direct light to an environment of use.

BACKGROUND OF THE INVENTION

Clamping work lights are known, including as disclosed, for example, in E-Z Red Company's U.S. Pat. No. 11,125,421, entitled "Clamping Work Light," and U.S. Pat. No. 10,962,180, entitled "Handheld Clamp Work Light," which patents are incorporated herein by reference in their entirety. These lights have worked well and have been favorably accepted in the market. However, improvement to the known clamping work lights is possible, and this invention provides an improved clamping work light.

SUMMARY OF THE INVENTION

A primary object of the present invention is to provide for an improved clamping work light.

The present invention is directed to a clamping work light comprising a light and a stand. The stand comprises two clamp arms. The light is an LED light and rotates horizontally and vertically, preferably by ratcheting movement to stop at multiple positions to focus the light on an environment of use ("work area"). The stand comprising the two clamp arms functions as both a stand for the light and a clamp to clamp the light to an object or surface. The clamp arms are generally T shaped and are connected to each other and have a torsion spring to provide for the clamping movement of clamp arms. Each clamp arm includes a top horizontal member of the T shape and vertical member of the T shape. At the bottom of each vertical member are horizontal inwardly facing swivel feet having a rubber cross-checked pad for grasping a surface. The top horizontal members may be grasped by the user to open the bottom horizontal swivel feet for clamping the feet to a surface. The arms will open from the closed position to about four inches apart for clamping to a number of different sized surfaces. The swivel feet engage each other when not clamped to an object. The light is attached to one of the clamp arms and will rotate horizontally 360 degrees around the clamp arm and rotate vertically about 240 degrees to direct light to the work area. The light may rotate to a storage position and snap-lock to one of the clamp arms, the back of the light having a recessed area which mates with one of the clamp arms. In this position, the light is compact and easy to store when not is use. Also, in this position, the clamping light may stand on the top horizontal members of the clamp arms and the light may be used in this position to focus light on a work area as shown in FIGS. 1 and 2. Also, in this position the top horizontal members of the arms may be grasped and pushed in to allow the swivel feet to open and be clamped to a surface. The light may be removed from the locked storage and standing position and rotate vertically to a second standing position to focus the light on a work area as shown in FIGS. 14-17. The light, in this position, may be rotated horizontally 360 degrees as shown in FIG. 16. From this position the light may be rotated vertically another 90 degrees and the top horizontal members of the clamp arm may be grasped and pushed inward to allow clamping of the bottom swivel feet of the clamp arms to clamp to a surface as shown in FIGS. 19 and 20. In this clamped position the light may be rotated horizontally 360 degrees and rotated vertically. Accordingly, the light is compact in the storage position and when in use may stand free allowing the light to be rotated in multiple directions or the light may be clamped to an object and allowing the light to rotate in multiple directions.

The light includes two rechargeable lithium-ion batteries, and a USB-C charge-port. There is a single charge indicator light which will flash to let one know when the batteries are charging and will turn solid green once the batteries are fully charged. The USB port cover sits deeply inside the cavity to protect the port from the environment, giving it an IPX4 rating.

The clamping work light's pivoting rubberized feet will grip a surface tightly without marring the surface. The checkered board rubber grip is over-molded into the feet to provide more friction, thereby preventing the light from sliding off of the clamped surface. The feet have a cylindrical cavity in the rubber, allowing it to be clamped onto non-flat or curved surfaces.

Utilizing the clamp arms as a stand, the clamping work light can be propped and angled on flat surface. One of the clamp arms includes over-molded rubberized stops to prevent the stand from scratching the surface upon which it stands.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

FIG. 13A is a back view of one of the clamping arms illustrating the torsion spring and retainer.

FIG. 13B is an enlarged view of section 13B of FIG. 13A.

FIG. 13C is an enlarged view of the clamping arm of FIG. 13A showing the clamping friction inserts which are inserted into slots in the clamp arms.

FIG. 16 shows the light of FIG. 14 and 360 degrees rotation of the light member.

FIG. 17 shows the light of FIG. 14 and the rotational movement of the light member in relation to the clamping arms.

FIG. 18 shows the light of FIG. 1 with the clamping arms in the open position for clamping to a surface.

DETAILED DESCRIPTION OF THE PREFERRED EMBODIMENTS

Figure 19:
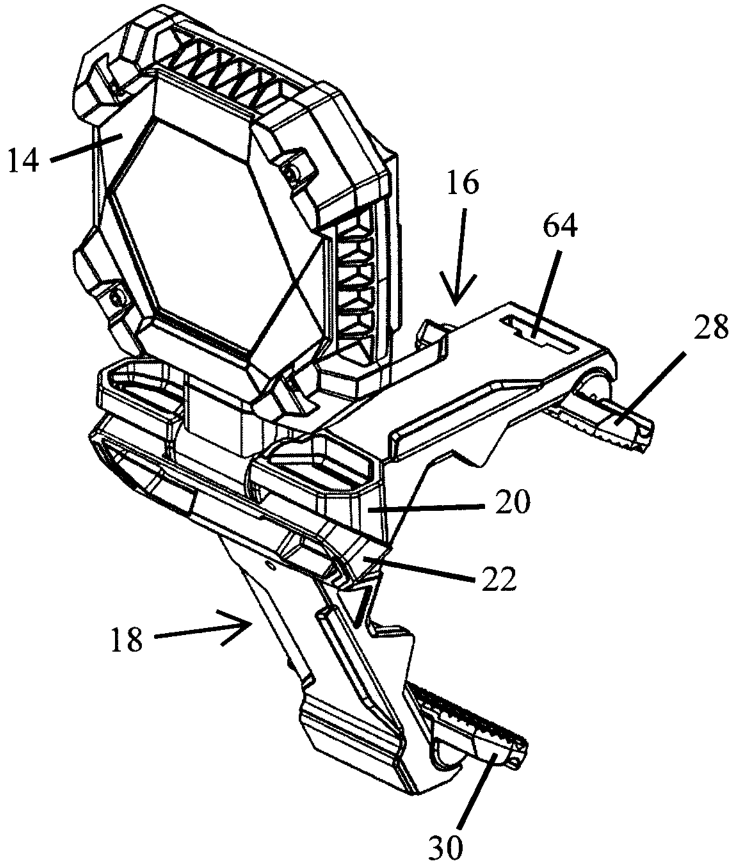
FIG. 19 is a front perspective view of the light of FIG. 1 with the clamping arms in an open position.
Figure 20:
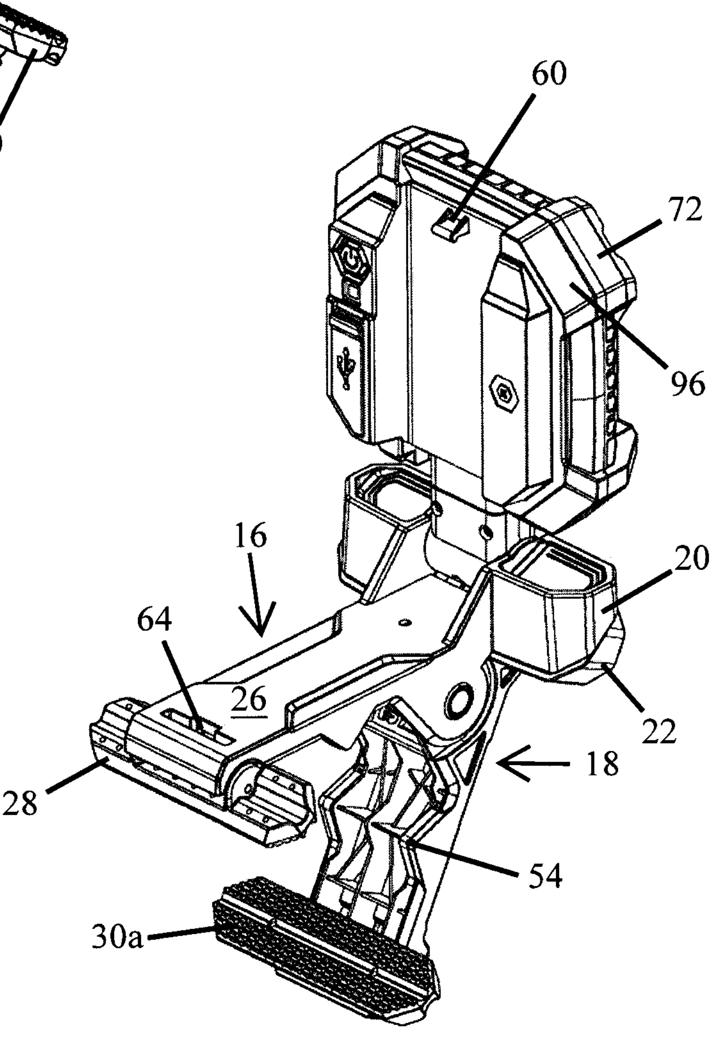
FIG. 20 a back perspective view of the light of FIG. 19.

The present invention is directed to a clamping work light. The invention may be used to direct light to a work area. The clamping work light includes a light and a stand. The stand comprises two clamp arms. The clamp arms function both as a stand for the light and as a clamp. The clamp arms function as a stand both when the light is locked to a clamp arm as shown in FIGS. 1-7 and when the light is unlocked from the clamp arm and rotated, for example, 90 degrees to a propped standing position as shown in FIGS. 14-17. The clamp arms may also be opened to clamp the light to a number of different size and shaped surfaces as shown in FIGS. 18-20. The light may be aimed in any direction by a double-axis pivoting assembly. The clamping work light invention provides for hands free lighting and allows for directing the light to a specific work area.

Referring to FIGS. 1-20, the working clamp light 10 includes a stand 12 and a light 14. Stand 12 includes a first clamp arm 16 and a second clamp arm 18, preferably made of plastic. The clamp arms 16 and 18 are generally T shaped and include horizontal members 20 and 22 and vertical members 24 and 26. At the bottom of vertical members 24 and 26 are feet 28 and 30, which feet are attached to the clamp arms and are adapted to swivel to different positions when the light is to be clamped to an object. Feet 28 and 30 include a cross-check pad 28*a*,30*a*, preferably of rubber or plastic, as seen, for example, in FIGS. 9 and 18-20 which allows for gripping of the feet to an object and avoid marring of a surface when the light is clamped to the surface. First clamp arm 16 includes a connector housing 40 attached to the first clamp arm and light 14 is attached to the housing 40. Connector housing 40 includes the rotation assembly as discussed hereafter.

First clamp arm 16 includes connecting members 42 and 44 which mate with corresponding connecting members 46 and 48 of second arm 18 for connecting arms 16 and 18. These connecting members are fastened by a screw 45 and dowel 47 to connect the first clamp arm 16 and the second clamp arm 18. Referring to FIGS. 9 and 13A-13C, there is a double torsion spring 50 between the connecting members to provide torque for the clamping action of first and second clamp arms 16 and 18. The spring 50 is held in place by retainer 52. There are two clamping friction inserts 54 in each clamp arm and which may grasp an object to avoid marring the object. The spring 50 keeps first and second clamp arms together as shown, for example, in FIGS. 1 and 14. The light is rotated from a storage position of FIGS. 1-7 to the standing position as shown in FIGS. 14-17. When the light member 14 is further rotated to a clamping position as shown in FIGS. 18-20, the top of first arm 16 and the top of second arm 18 are pushed toward each other to create an opening between the bottom portions of first and second clamp arms for engaging an object or surface. The clamp arms will open up to four inches allowing the clamping work light to clamp to many different size objects or surfaces.

Figure 12:
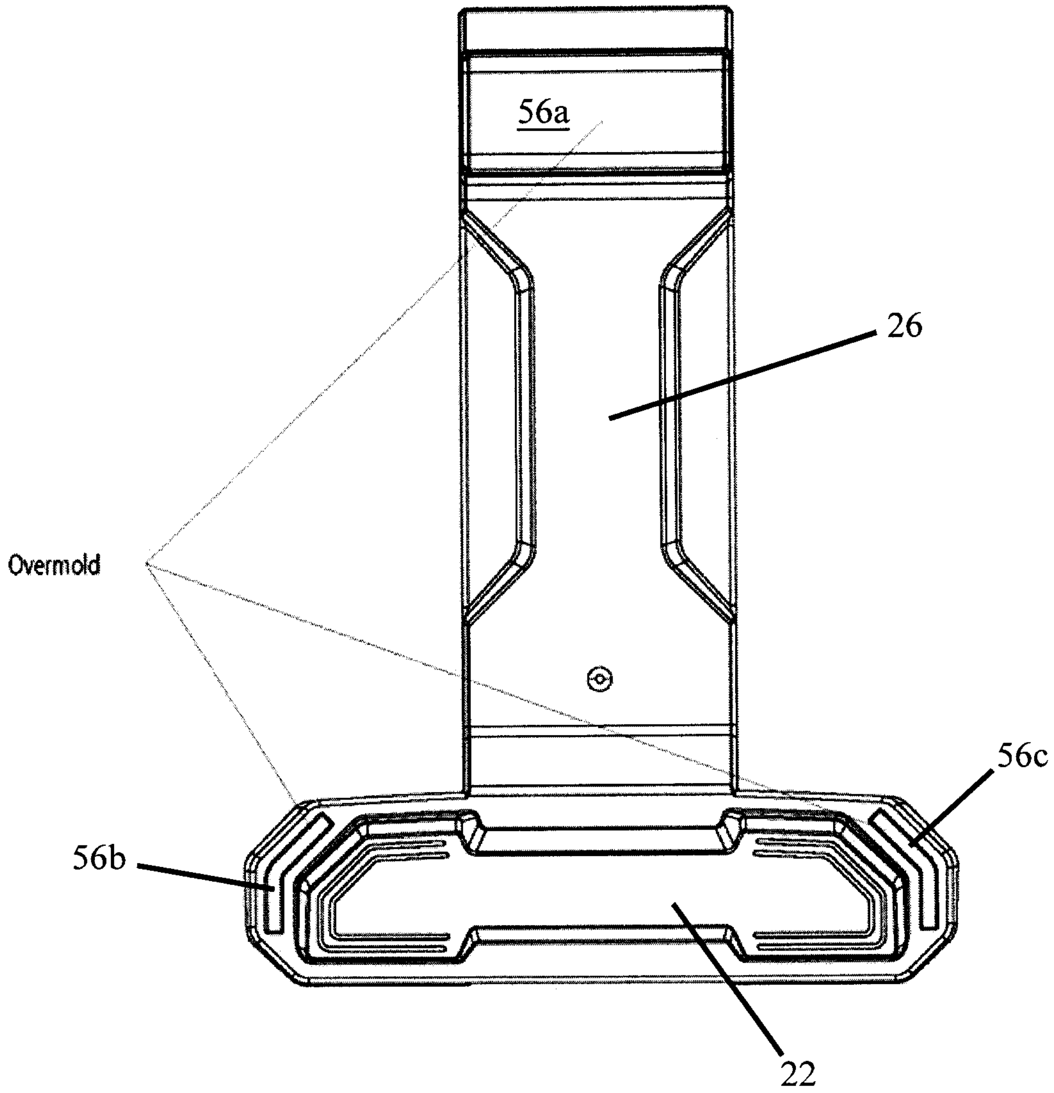
FIG. 12 is a front view of one of the clamping arms showing the overmolded material to prevent the marring of the surface on which a light is placed in a position such as in FIG. 14.
Figure 14:
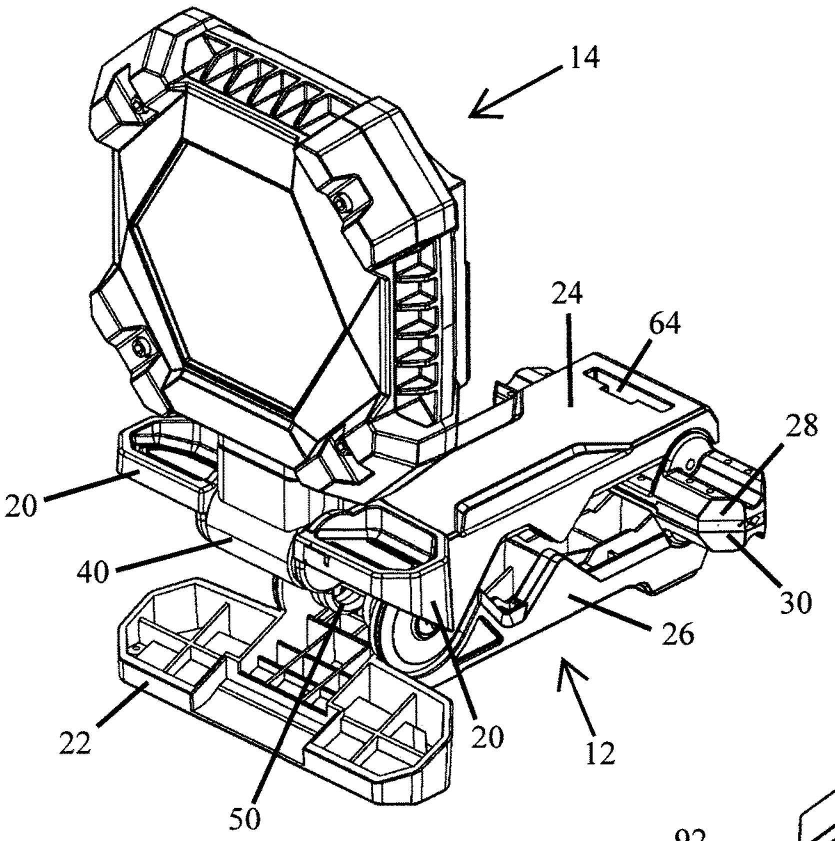
FIG. 14 shows the clamping work light with the light moved from the storage position to a propped standing position to direct light to a work area.
Figure 15:
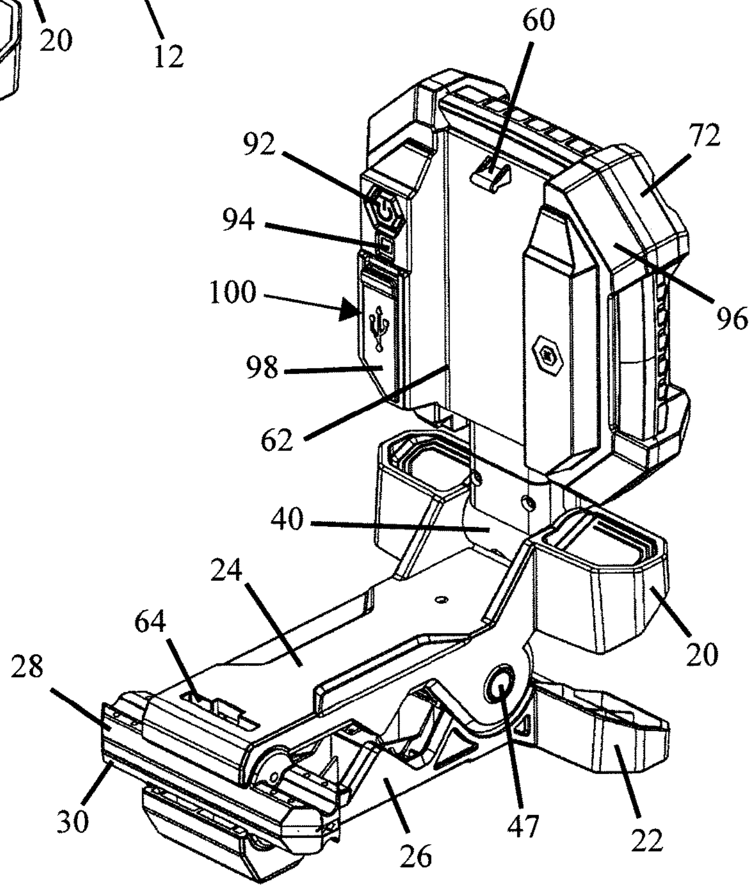
FIG. 15 is a back perspective view of the light of FIG. 14.

Referring to FIG. 12, the second clamp arm 18 includes overmolded rubberized stops 56*a*, 56*b* and 56*c* which prevents the light 10 from scratching the surface on which the light stands as shown in FIGS. 14-17.

Figure 1:
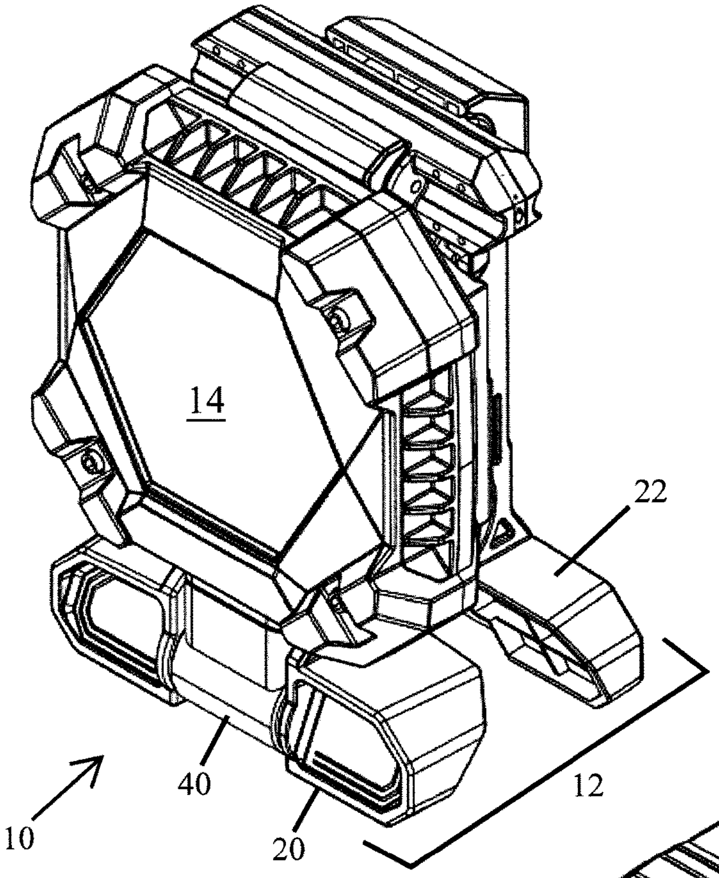
FIG. 1 is a front perspective view of the clamping work light invention in the stored/standing position.
Figure 2:
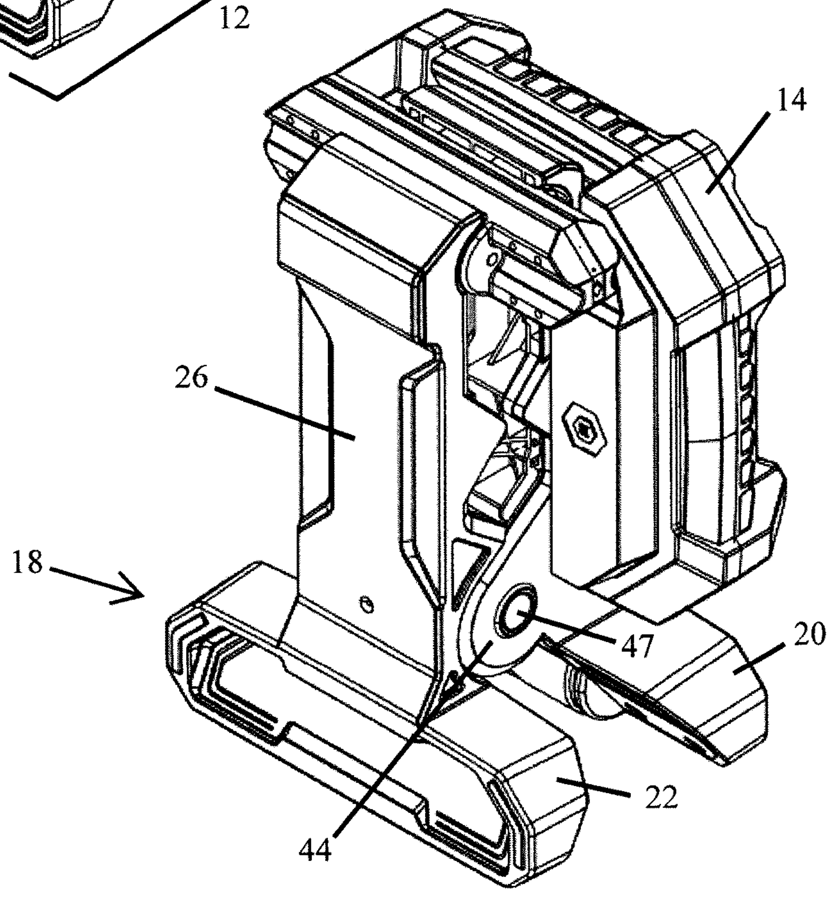
FIG. 2 is a back perspective view of the light of FIG. 1.
Figure 3:
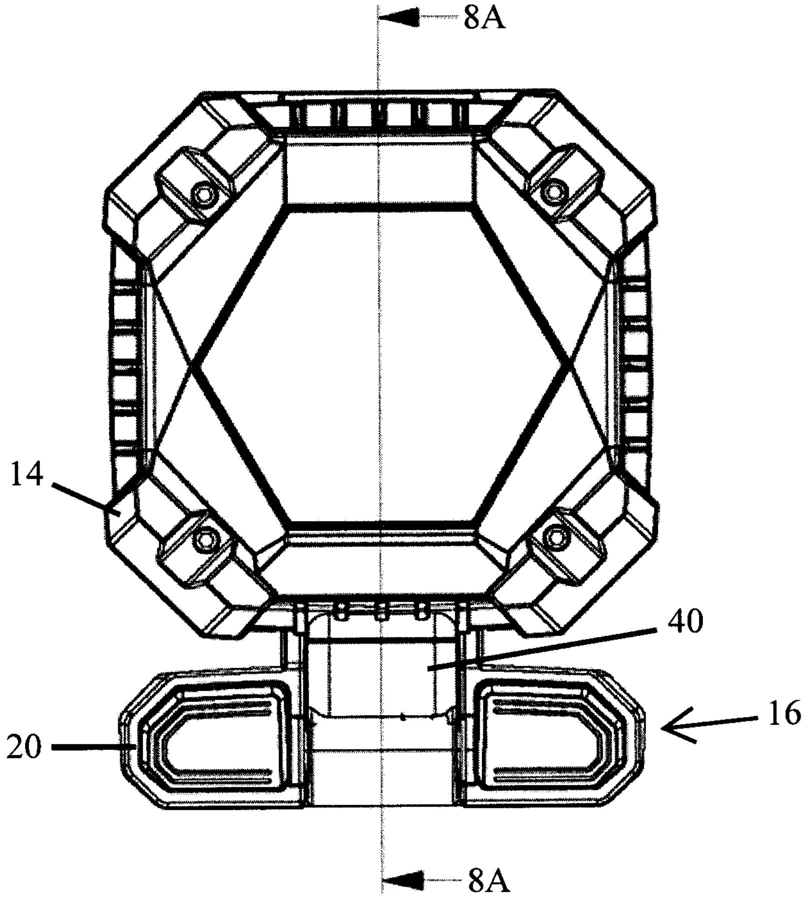
FIG. 3 is a front view of the light of FIG. 1.
Figure 4:
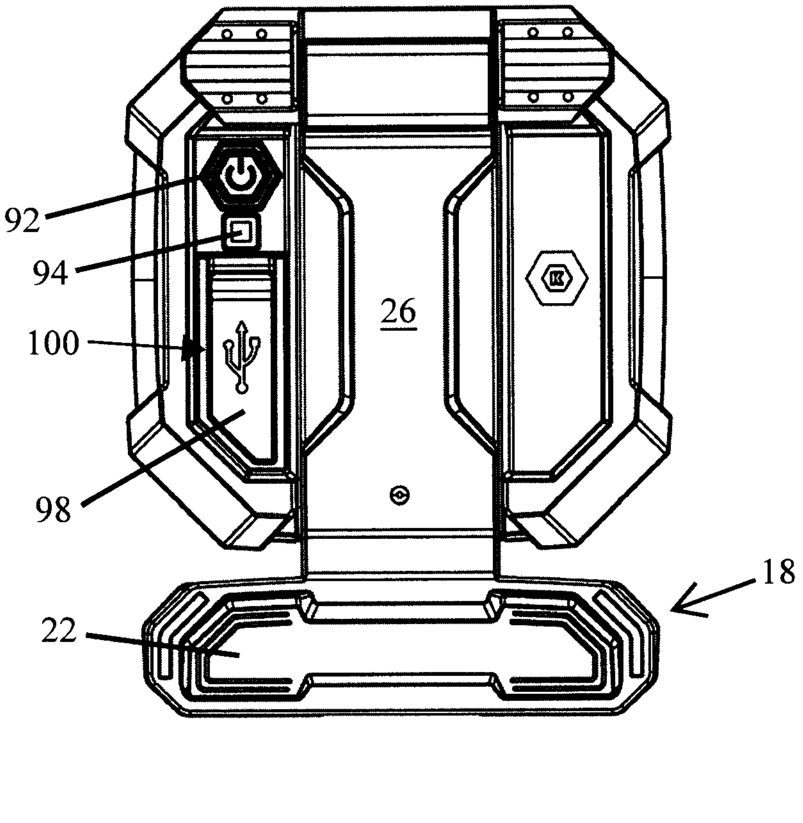
FIG. 4 is back view of the light of FIG. 1.
Figure 5:
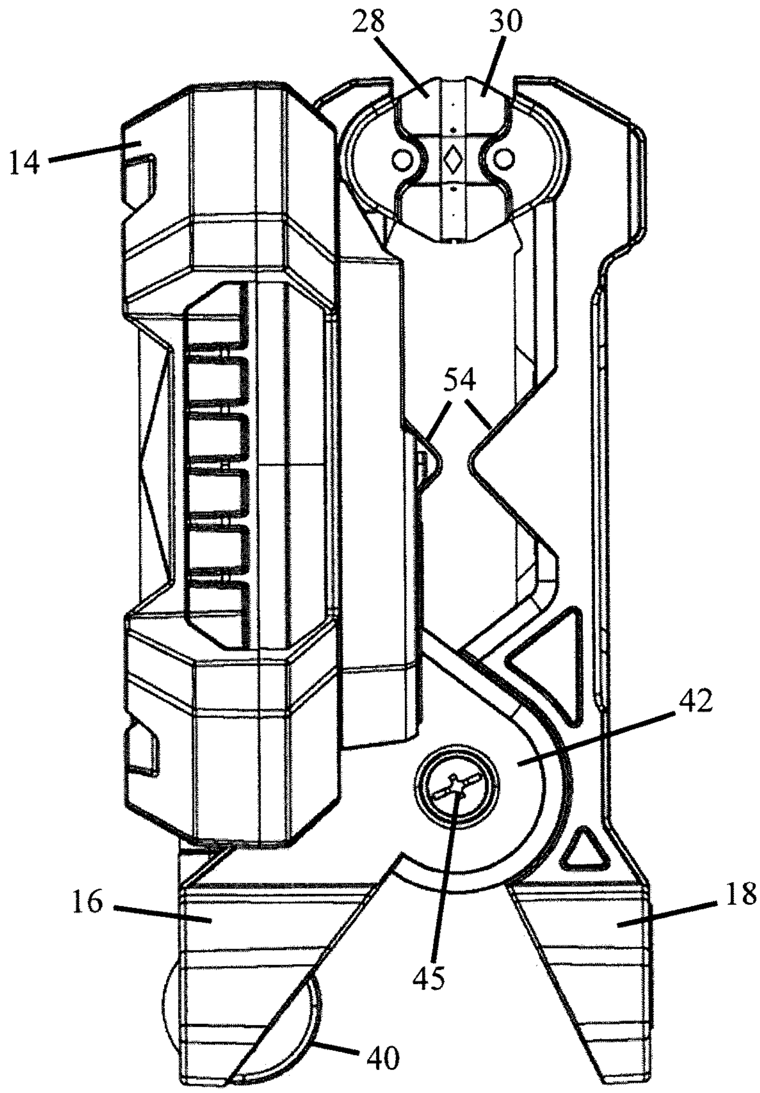
FIG. 5 is a side view of the light of FIG. 1.
Figure 6:
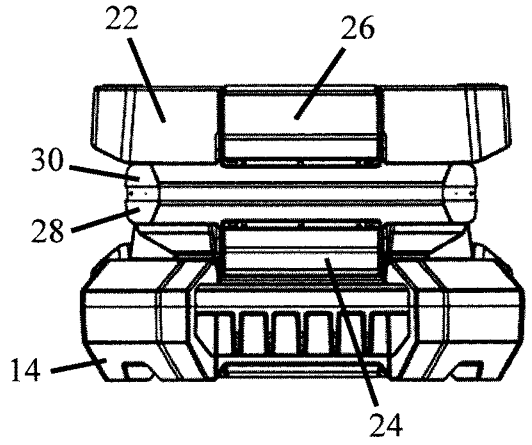
FIG. 6 is a top view of the light of FIG. 1.
Figure 7:
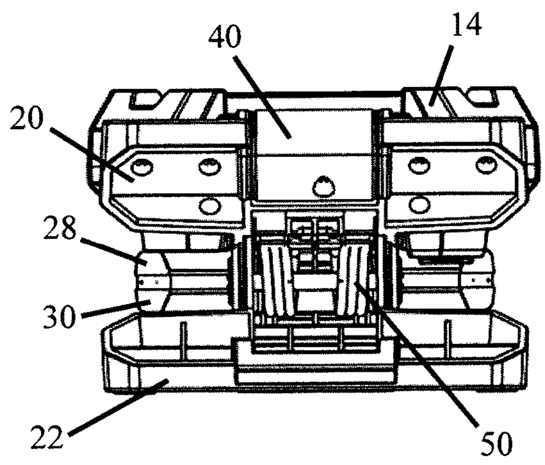
FIG. 7 is a bottom view of the light of FIG. 1.
Figure 8A:
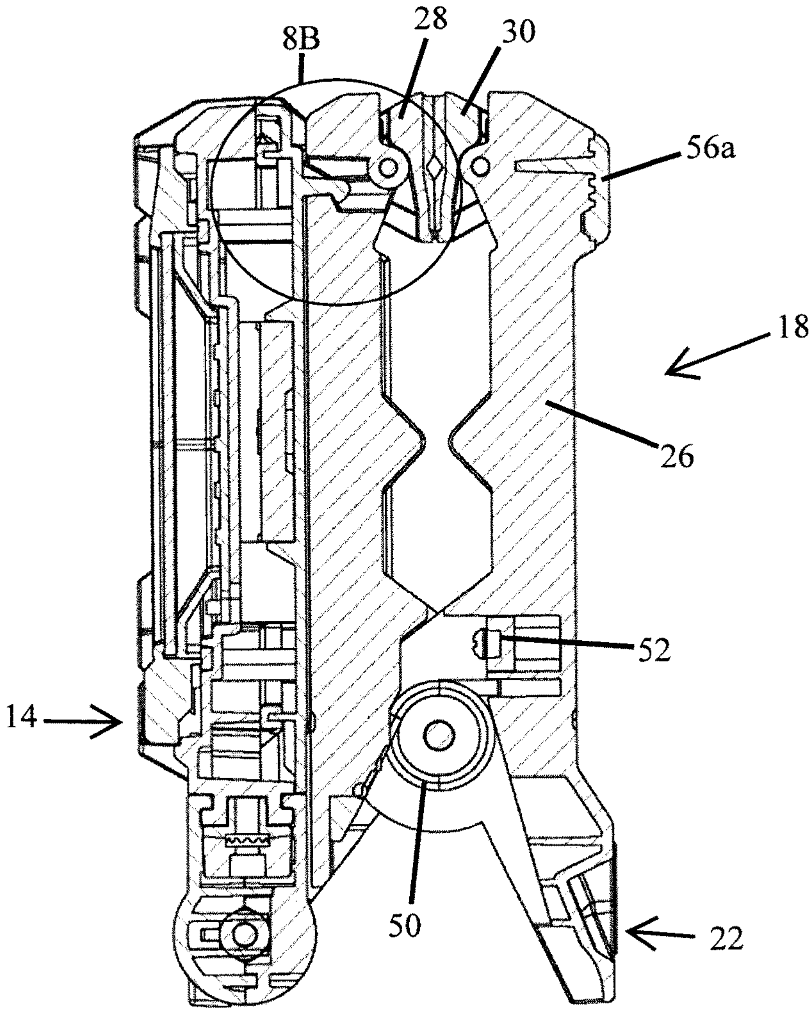
FIG. 8A is a cross-section of the light of FIG. 1 taken along lines 8A, 8A of FIG. 3.
Figure 8B:
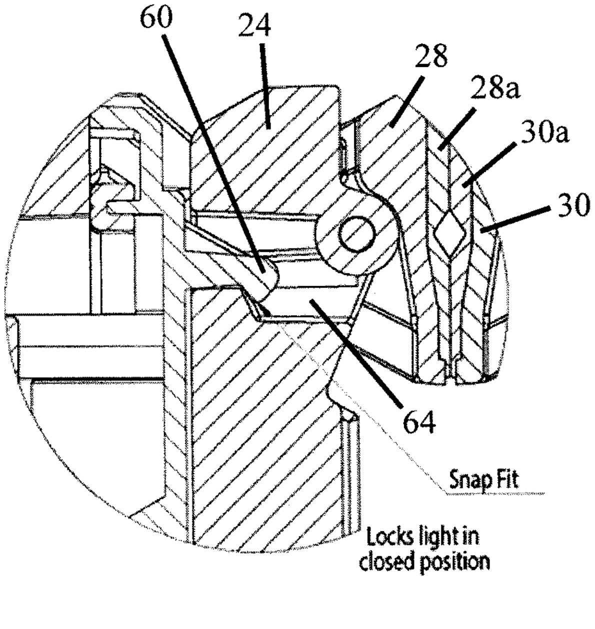
FIG. 8B is an enlarged view of section 8B of FIG. 8A.
Figure 8C:
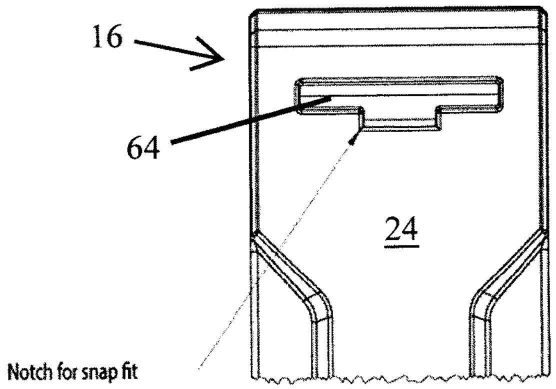
FIG. 8C shows a notch in the clamping arm for snap fit of the light member into the clamping arm.
Figure 9:
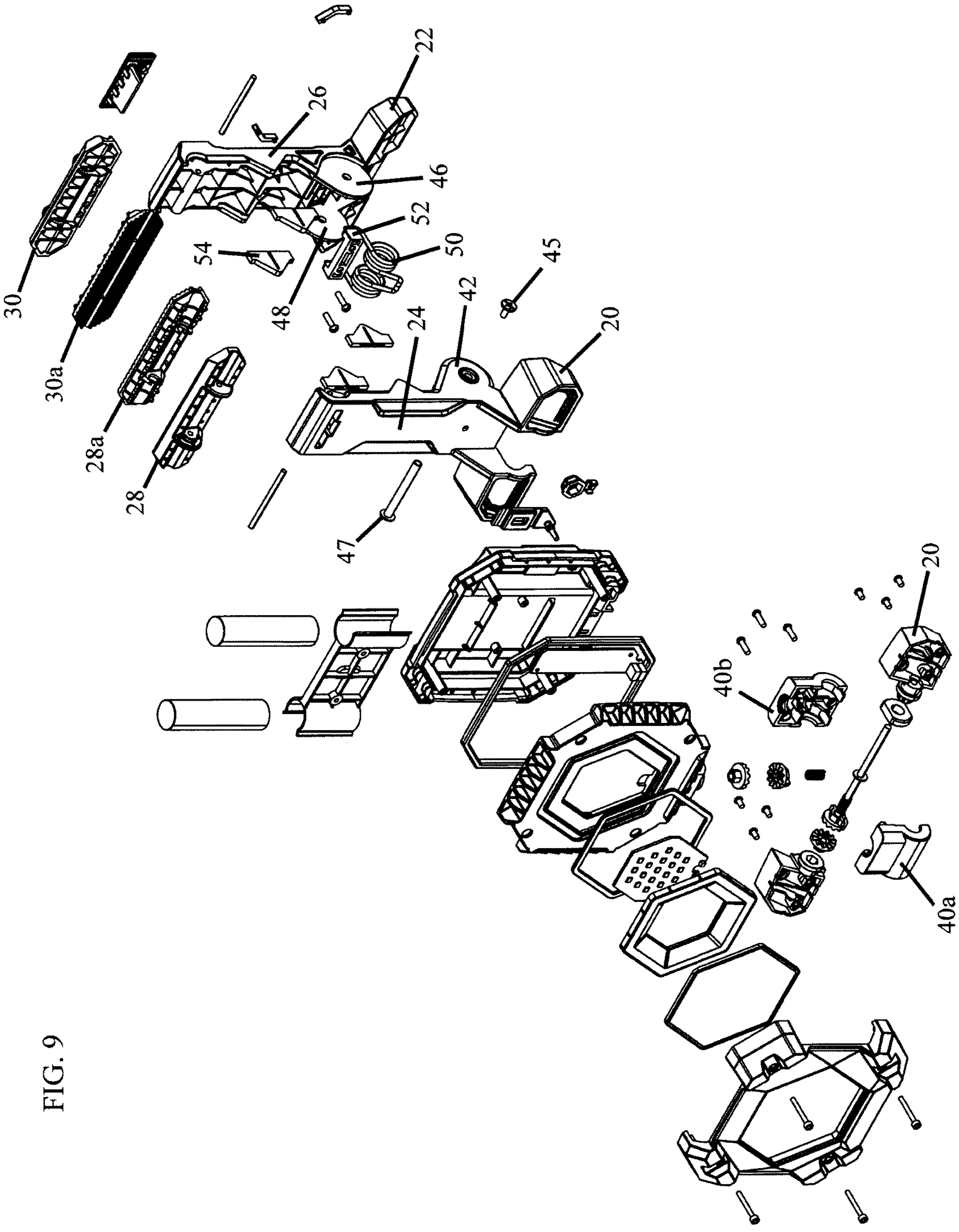
FIG. 9 is an exploded view of the light of FIG. 1.

Referring to FIGS. 8A-8C, there is shown the snap-lock mechanism for locking light 14 to stand 12. The locking mechanism comprises a clip 60 on the back of light 14 in recessed area 62 of the light 14 which snap-locks into notch 64 on first clamp arm 16. The vertical member 24 of the clamp arm 16 fits into recessed area 62 of stand 12.

Figure 10:
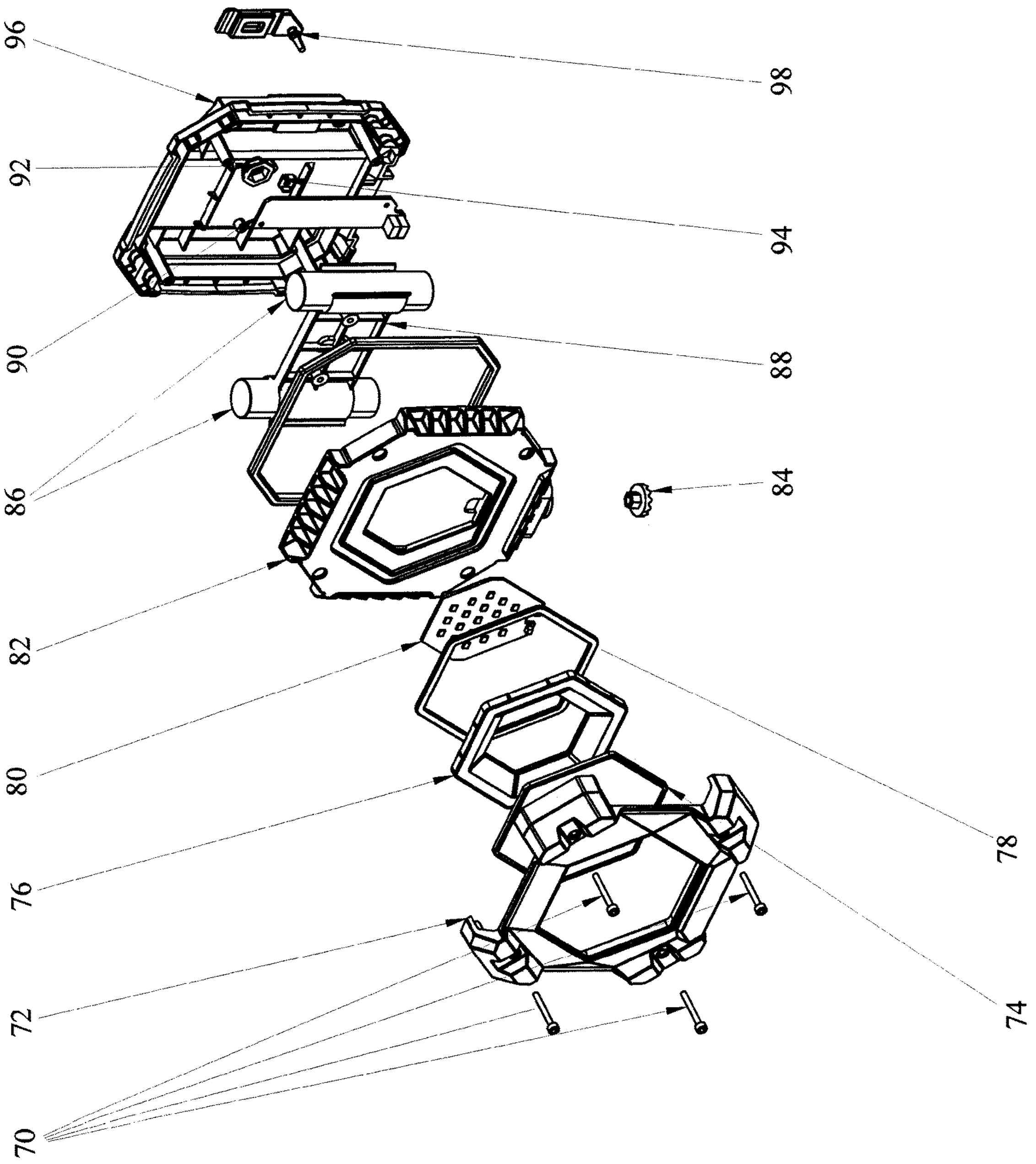
FIG. 10 is an exploded view of the light member of the light of FIG. 1.

Referring to FIG. 10, there is shown an exploded view of light 14 and the components thereof. Specifically, the light 14 includes fasteners 70, front cover 72, lens 74, reflector 76, gasket 78, SMD board 80, heat sink 82, swivel gear 84, batteries 86, battery retainer 88, electronics board 90, on-off button 92, charge light indicator 94, back cover 96 and charge port cover 98 covering the charging port 100. The light is turned on and off at button 92 and may include different light intensities. The batteries are rechargeable at charge port 100.

As stated, light 14 will pivot on the first arm 16 from a storage/standing position as shown in FIGS. 1-7 to a standing propped position as shown in FIGS. 14-17 for directing the light to a work area. Light 14 will also rotate 360 degrees on first arm 16 as seen, for example, in FIG. 16 and will rotate vertically about 240 degrees as shown in FIG. 17.

Figure 11A:
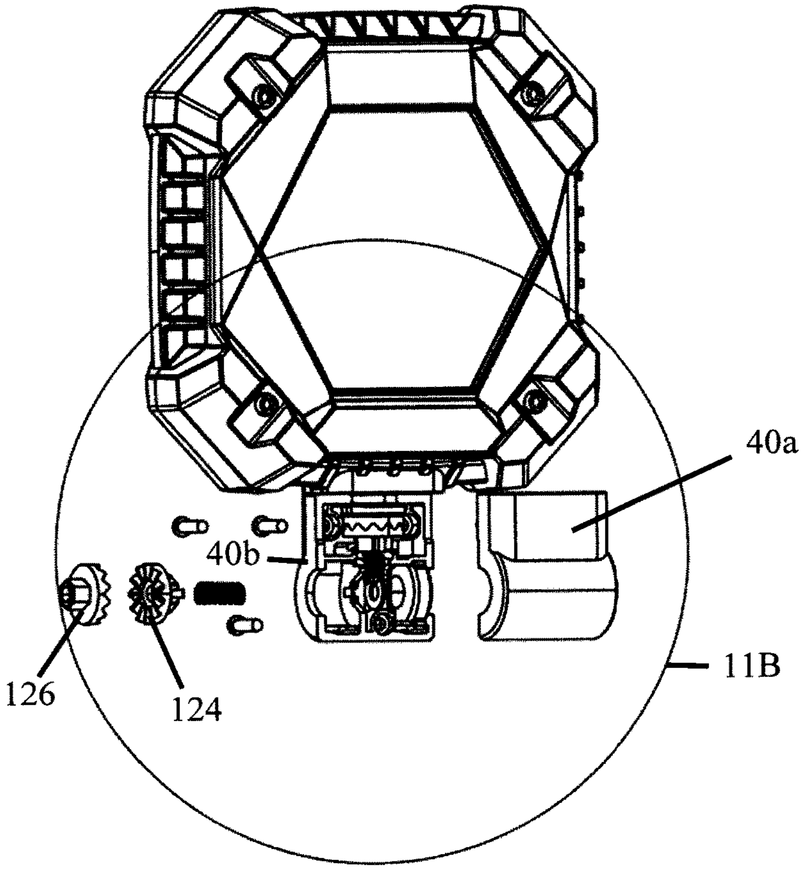
FIG. 11A is a partial exploded view of the light of FIG. 1.
Figure 11B:
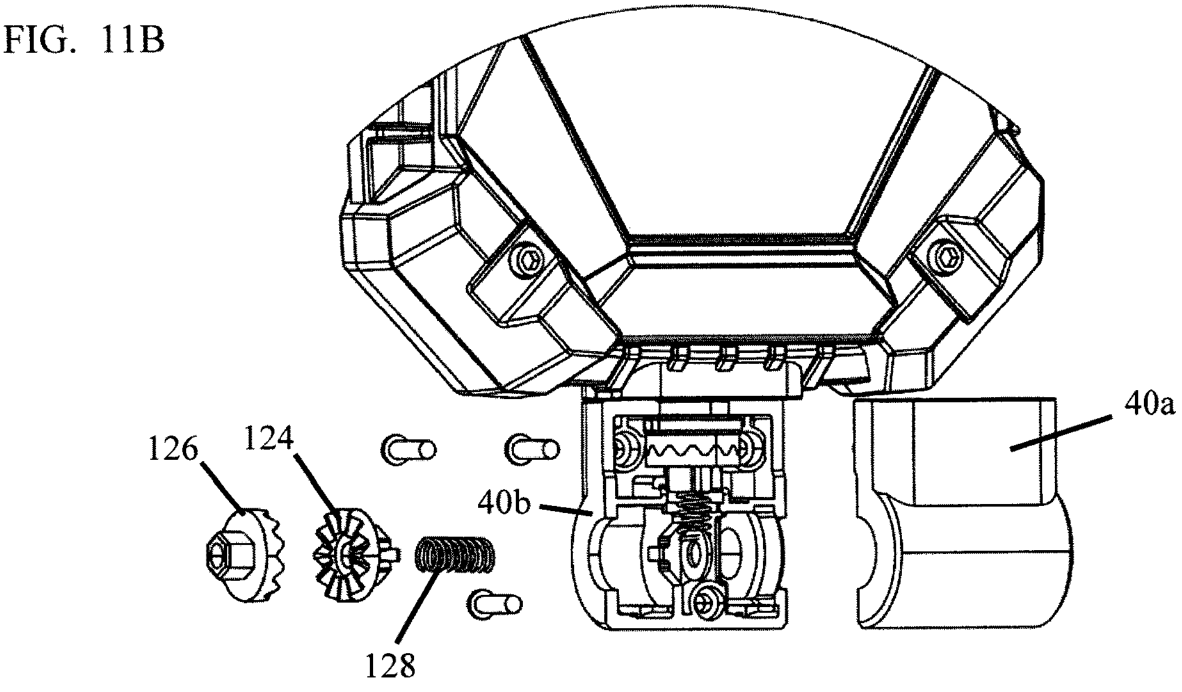
FIG. 11B is an enlarged view of section 11B of FIG. 11A.
Figure 11C:
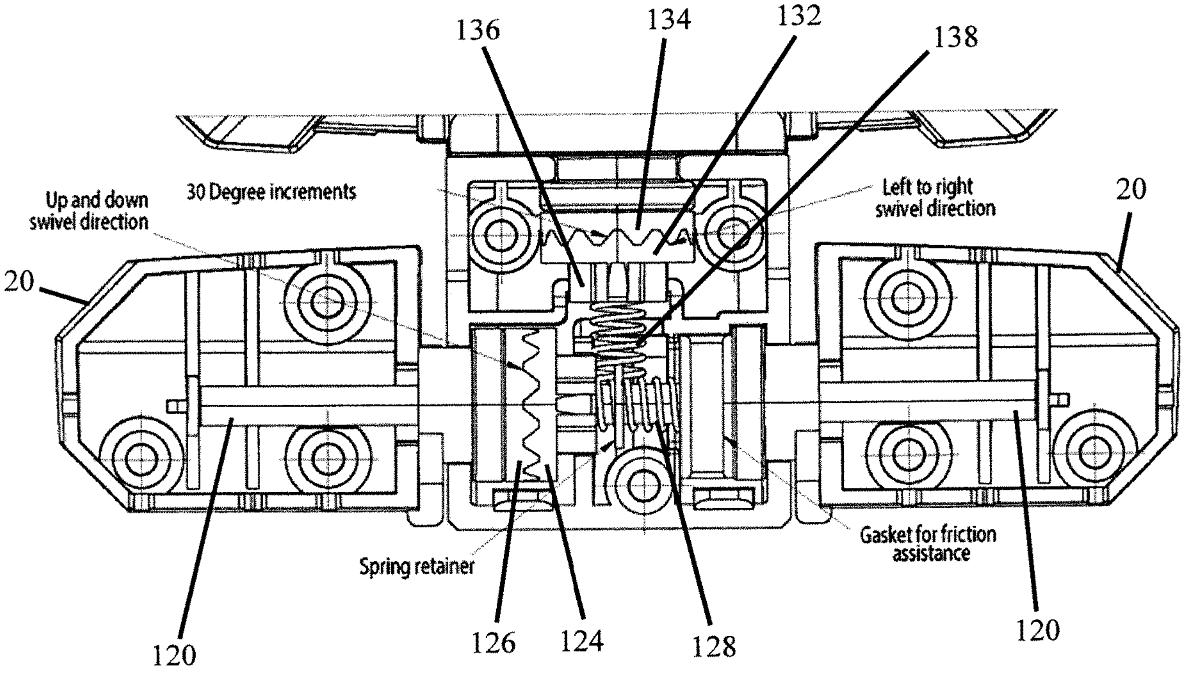
FIG. 11C is a further enlarged view of the light of FIG. 1 and showing the mechanisms for the rotational movement for the light member.

Referring to FIGS. 11A-11C, there is shown a presently preferred embodiment of the double-axis pivoting assembly for clamping work light 10. It is understood that other pivoting assemblies may be used without departing from the scope of the invention. There is the connector housing 40 having housing parts 40*a* and 40*b* which is attached to first clamp arm 16. The light 14 is attached to the housing 40. Within the housing are two double-axis pivoting assemblies. The pivot assembly allowing the light to pivot vertically includes a rod 120 and attached thereto are a first rachet gear 124 and a second ratchet gear 126, allowing for 30 degree increments of rotation. The assembly further includes a retainer spring 128 and gasket 130 for friction assistance as shown in FIG. 11C. The pivoting assembly for rotating light 14 360 degrees includes ratchet gears 132 and 134 which is connected to a base 136 of light 14 and spring 138 to provide for ratcheting rotational movement of light 14.

As seen in FIGS. 1-7, the light 14 is shown stored in stand 12. The light may be turned on and off and used in this position and used similar to a regular portable light. The light 14 may be pivoted to a non-storage position as shown in FIGS. 14-17, and the light may be clamped to an object as shown in FIGS. 18-20. It is understood that light 14 may pivot in a number of different stop positions depending on where the light needs to be focused.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A clamping work light which may clamp to an object or be free standing in at least two different positions comprising a stand and a light member, the light member includes a front having an LED light and a back having a recessed area, the stand comprises a first clamp arm to which the light member is attached and a second clamp arm, the first and the second clamp arms being generally T shaped and having top horizontal members of the T shape and clamping feet at an end thereof, and the stand is adapted to receive the light member in a storage position wherein the back of the light member with the recessed area is adapted to mate with a vertical member of the T shape of the first clamp arm wherein the light member is capable of being locked into the first clamp arm;

the first clamp arm of the stand comprising a first pivoting assembly allowing the light to pivot to a plurality of non-storage positions and a second pivoting assembly allowing the light member to rotate 360 degrees; and the stand is adapted to allow the first and second clamp arms to clamp to an object or to be free standing in at least two different positions;

wherein the stand is free standing in a first position on the top horizontal members of the T shape of the first and second clamp arms and a second position on the second clamp arm.

2. The clamping work light of claim 1 wherein the clamping feet are adapted to pivot.

3. The clamping work light of claim 2 wherein the pivoting feet include a pad having a cross-checked pattern.

4. The clamping work light of claim 3 wherein the pad is made of rubber or plastic.

5. The clamping work light of claim 1 wherein the first clamp arm includes a notch and the light member includes a clip adapted to engage the notch for placing the light member in a locked storage position.

6. The clamping work light of claim 1 wherein the bottoms of the clamping feet are adapted to engage each other when the light member is not in a clamped position.

7. The clamping work light of claim 1 wherein the first pivoting assembly provides for ratcheting pivoting movement and the second pivoting assembly provides for ratcheting rotational movement.

8. The clamping work light of claim 1 wherein the light member is octagonal in shape.

9. The clamping work light of claim 1 further comprising a USB port for outbound charging.

10. The clamping work light of claim 9 further comprising a battery charge level indicator.

11. The clamping work light of claim 1 wherein the first and the second clamp arms are adapted to open up to four inches to clamp to an object.

12. The clamping work light of claim 1 wherein the second clamp arm includes one or more overmolded rubberized stops.

13. The clamping work light of claim 1 wherein the first and second clamp arms are joined by corresponding connecting members and there is a torsion spring therebetween.

* * * * *